United States Patent [19]

Aoki et al.

[11] Patent Number: 4,501,137
[45] Date of Patent: Feb. 26, 1985

[54] METHOD FOR DETECTING KNOCKING IN INTERNAL COMBUSTION ENGINE

[75] Inventors: Keiji Aoki; Shinichiro Tanaka, both of Shizuoka, Japan

[73] Assignee: Toyota Jidosha Kabushiki Kaisha, Toyota, Japan

[21] Appl. No.: 475,650

[22] Filed: Mar. 15, 1983

[30] Foreign Application Priority Data

Jun. 7, 1982 [JP] Japan .................................. 57-97351

[51] Int. Cl.³ .............................................. G01L 23/22
[52] U.S. Cl. ......................................... 73/35; 123/425
[58] Field of Search ...................... 73/35; 123/425, 435

[56] References Cited

U.S. PATENT DOCUMENTS 4,387,588  6/1983  Kaji ........................................ 73/35
4,420,968 12/1983  Dudeck et al. .......................... 73/35

Primary Examiner—James J. Gill

Attorney, Agent, or Firm—Kenyon & Kenyon

[57] ABSTRACT

A method for detecting knocking in internal combustion engine, wherein a plurality of constants K is stored corresponding to a plurality of ranges of engine speed. A reference value is calculated from a means value of an output signal of a knock sensor, from the constant K corresponding to an engine speed and from a predetermined offset value, through a calculation of multiplying the mean value by the constant K and adding the offset value to the result of the multiplication. Then an output signal, newly provided from the knock sensor after the calculation of the mean value, is compared with the reference value so as to decide that knocking occurs in the engine when the newly given output signal of the knock sensor exceeds the reference value. Therefore, the reference value can be suitably determined corresponding to the engine speed so that a detectable lower limit of knocking intensity is kept to be substantially constant.

11 Claims, 7 Drawing Figures

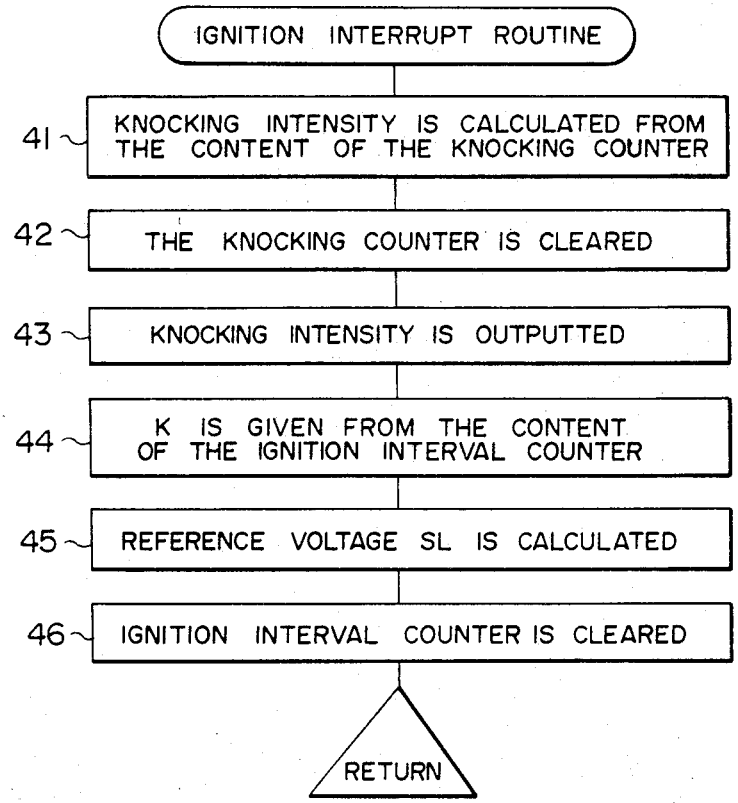
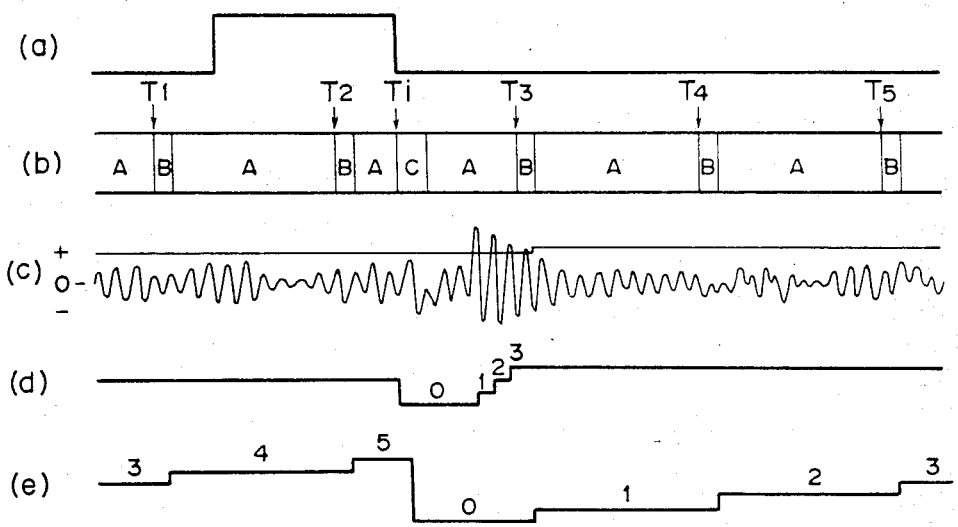

METHOD FOR DETECTING KNOCKING IN INTERNAL COMBUSTION ENGINE

BACKGROUND OF THE INVENTION

1. Field of the Invention

The present invention relates to a method for detecting knocking in an internal combustion engine.

2. Brief Description of Prior Art

In a prior art apparatus, vibration of an engine or pressure in a cylinder of an engine is detected by a knock sensor such as an accelerometer, and an output signal of the knock sensor is delivered to a microcomputer which decides whether knocking occurs in the engine according to the output signal of the knock sensor. The microcomputer calculates a reference value according to the output signal through the following calculation. At first, a mean value of the absolute values of amplitudes of the output signal is calculated so as to remove noises in the signal, and the mean value is multiplied by a constant K; then an offset value is added to the result of the multiplication for compensating for deviation of performances of individual detecting systems. Thereafter, the microcomputer compares a newly detected output signal of the knock sensor with the reference value determined above and decides that the knocking occurs in the engine when the newly detected output signal exceeds the reference value. As shown by a solid line A in FIG. 1, provided that the offset value is determined to be constant, the optimum constant K has to be changed depending upon the engine speed in order to exactly detect a predetermined constant level of knocking intensity in a whole region of the engine rotational speed. In general, both an upper limit defined by a line H and a lower limit defined by a line L exist. The upper limit H is set to prevent the knock detecting apparatus from not detecting a high level of knocking and the lower limit L is set to prevent the apparatus from erroneously detecting knocking. In the conventional method, the constant K is determined to be constant, for example 4, in an area R defined by two horizontal two-dots-dash lines in FIG. 1, independently from the engine speed. The area defined by the lines H and L has substantially a U-shape, and there is a region of the engine rotational speed where the constant K in the area R is usually greater than the optimum constant K on the line A. Hence, only knocking with relatively strong intensity can be detected within the above-mentioned region, particularly at an engine speed of about 2,000 rpm where the optimum constant K is substantially minimum. This is one disadvantage of the conventional method. Another disadvantage of the conventional method is that the constant K must be precisely preset in order to keep the constant K in the area R.

SUMMARY OF THE INVENTION

Accordingly, it is an object of the present invention to provide a knocking detecting method for an internal combustion engine in which three values of a reference level compared with an output from a knock sensor are determined in accordance with a low engine speed, an intermediate engine speed and a high engine speed, respectively, so that a substantially constant level of knocking is detectable over the entire region of engine rotational speeds.

According to the present invention, a plurality of constants K are stored corresponding to a plurality of ranges of engine speed. A reference value is calculated from a mean value of an output signal of a knock sensor, from the constant K corresponding to an engine speed and from a predetermined offset value, through a calculation of multiplying the mean value by the constant K and adding the offset value to the result of the multiplication. Then a newly provided output signal from the knock sensor is compared with the reference value so as to decide that knocking occurs in the engine when the newly given output signal of the knock sensor exceeds the reference value. In sum, according to the present invention, the reference value can be suitably determined corresponding to the engine speed so that a detectable lower limit of knocking intensity is maintained substantially constant.

BRIEF DESCRIPTION OF DRAWINGS

FIG. 3 is an explanatory view showing a construction of a control register in FIG. 2;

FIG. 6 is a flow chart showing an ignition interrupt routine of the embodiment; and FIGS. 7(a) to (f) are diagrams showing timing of various signals of the embodiment.

DETAILED DESCRIPTION OF A PREFERRED EMBODIMENT

Hereafter, a preferred embodiment of the present invention is explained in more detail referring to the accompanied drawings.

Figure 1:
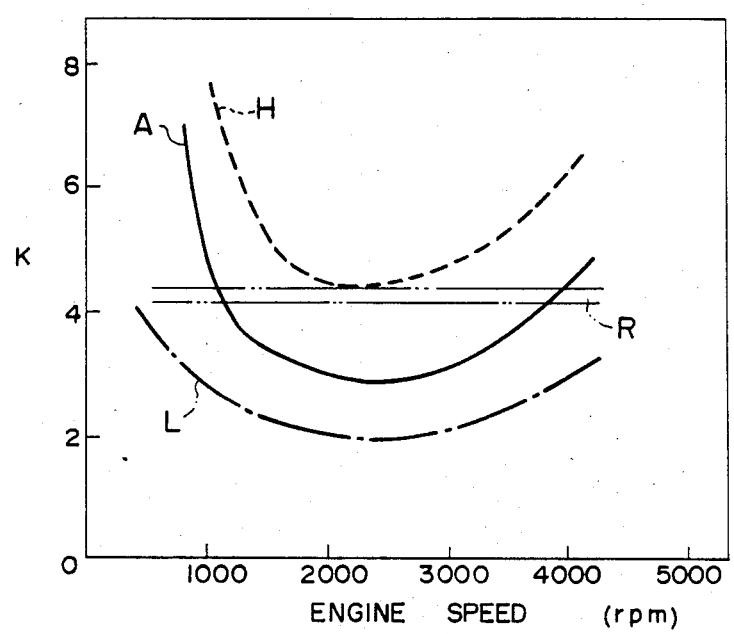
FIG. 1 is a diagram showing a relationship between a constant K and engine speed.
Figure 2:
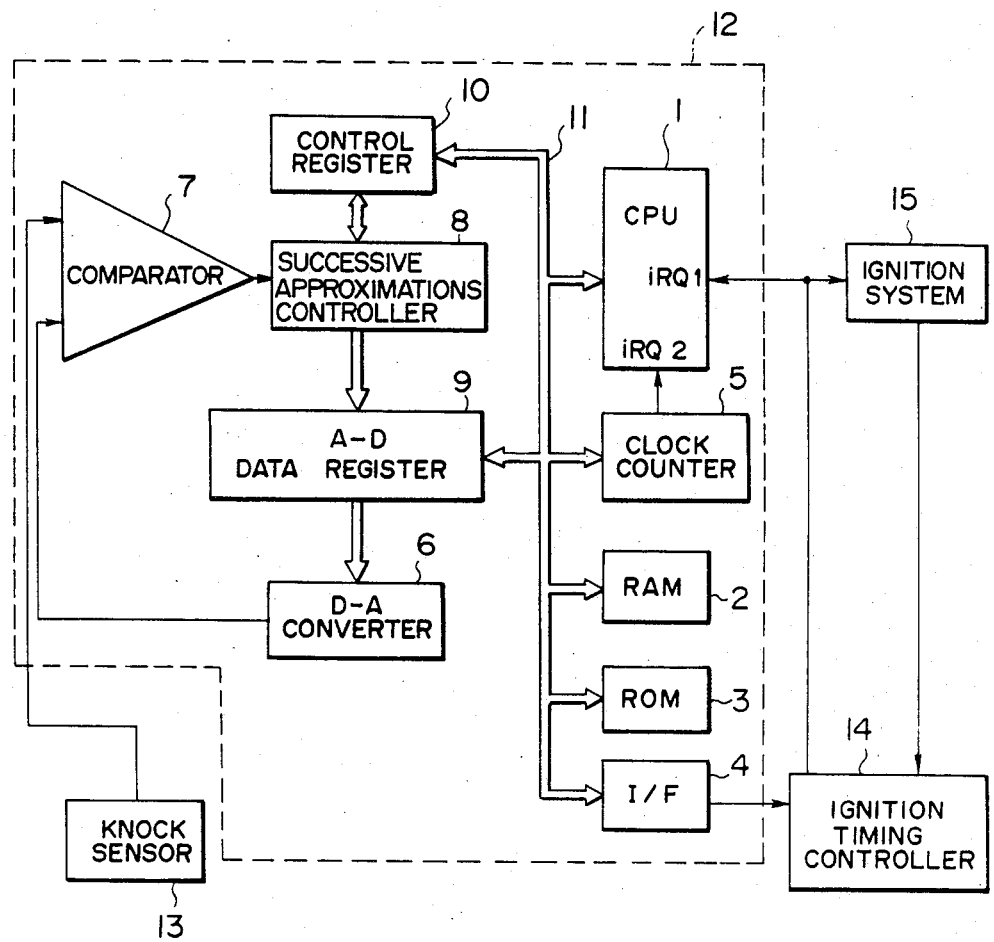
FIG. 2 is a block diagram showing an embodiment of the present invention.

As shown in FIG. 2, a knocking detecting apparatus according to the embodiment includes a one-chip microcomputer 12 for deciding if knocking is occurring in an internal combustion engine, a knock sensor 13 for sensing vibrations of the engine and for feeding an output signal corresponding to the vibration to the microcomputer 12, an ignition timing controller 14 for controlling the ignition timing of the engine according to the decision of the microcomputer 12, and an ignition system 15 for igniting a mixture gas in the engine.

Figure 5:
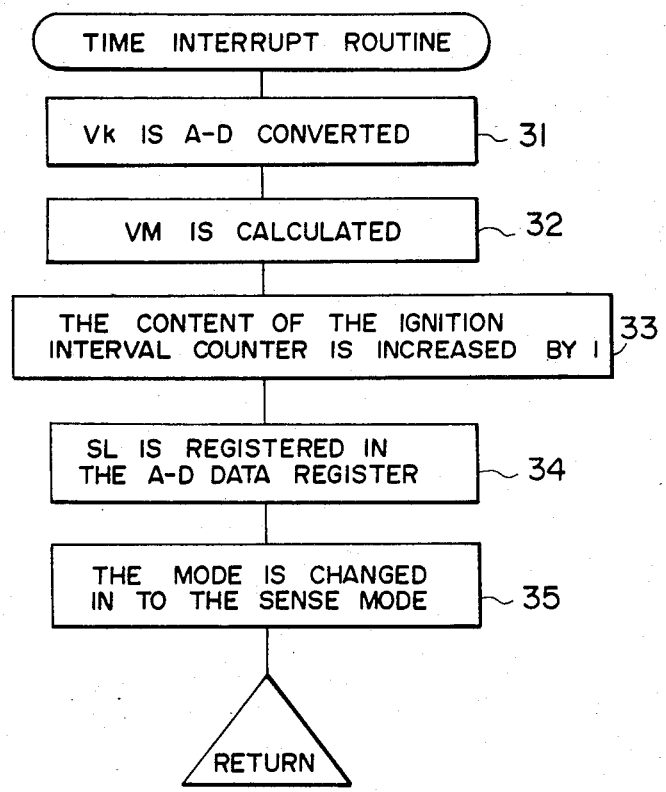
FIG. 5 is a flow chart showing a time interrupt routine of the embodiment.

The computer 12 includes a comparator 7 which receives the output signal Vk of the knock sensor 13 and a reference voltage SL and compares the output signal Vk with the reference voltage SL, an interface 4 connected to the ignition timing controller 14, and a central processing unit (CPU) 1 which carries out various arithmetic and logic operations and is connected at a terminal iRQ1 with the ignition timing controller 14. In the computer 12, the CPU 1 is connected through a bus 11 with a random access memory (RAM) 2, a read only memory (ROM) 3, the interface 4, a clock counter 5, an analog-digital (AD) data register 9 and a control register 10. The RAM 2 temporarily stores the result of the operation of the CPU 1 and data. The ROM 3 stores a program of the CPU 1 or a constant value described hereinafter. The interface 4 feeds various signals from the CPU 1 to the ignition timing controller 14. The clock counter 5 feeds an interrupt command signal to a terminal iRQ2 of the CPU1, so that a time interrupt routine shown in FIG. 5 is started in response to the interrupt command signal produced by counter 5 at predetermined time intervals, for example, 2 ms. The DA converter 6 converts eight-bit digital data into an analog signal to feed the reference voltage SL to the comparator 7. The control register 10 controls the successive approximations controller 8 so that the computer 12 effects two alternative operation modes, that is, a sense mode and an AD converting mode. In the sense mode, the DA converter 6 converts eight-bit digital data stored in the AD data register 9 as a reference voltage SL into an analog signal, so that the reference voltage SL is fed to the comparator 7 which compares the output signal Vk with the reference signal SL to decide whether knocking is occurring. Also in the sense mode, the successive approximations controller 8 passes the output signal of comparator 7 into the control register. In the AD converting mode, the DA converter 6 and the comparator 7 and the successive approximations controller 8 and the AD data register 9 comprise an AD converter by using the successive approximations technique. The AD converter converts the output signal Vk from an analog signal into a digital signal and feeds the digital signal through the AD data register to the CPU 1.

As shown in FIG. 3, the control register 10 comprises 4 (four) bits D0, D1, D2 and D3. The least significant bit D0 defines a start flag for starting the AD converting mode when "1" is written in it. The second bit D1 defines a start flag for starting the sense mode when "1" is written in it. The AD converting mode is stopped when "0" is written in the bit D0, and the sense mode is stopped when "0" is written in the bit D1. The bit D2 is unused and is always "0". The bit D3 defines a flag for setting a result of the comparison in the comparator 7, that is, "1" is written when the reference signal SL is greater than the output signal Vk, and otherwise "0" is written. On finishing the AD converting mode, the bit D3 is set to be "1", and the bit D3 is set to be "0" when the AD converting mode or the sense mode is started. In the sense mode, when the bit D3 changes from "1" to "0", the control register 10 feeds a signal to the CPU1 so that a count of a knocking counter provided in the CPU1 is increased by "1". The count of the knocking counter indicates knocking numbers.

The ROM 3 prestores data of constant K corresponding to engine speed as shown in a table below. In the table, the engine speed is indicated by the count of a counter which counts clock pulses between two successive ignitions of the engine.

TABLE

| Content of the counter | 0~3 | 4~10 | 11 or more than 11 |
|---|---|---|---|
| Value of the constant K | 4 | 3 | 4 |

Figure 4:
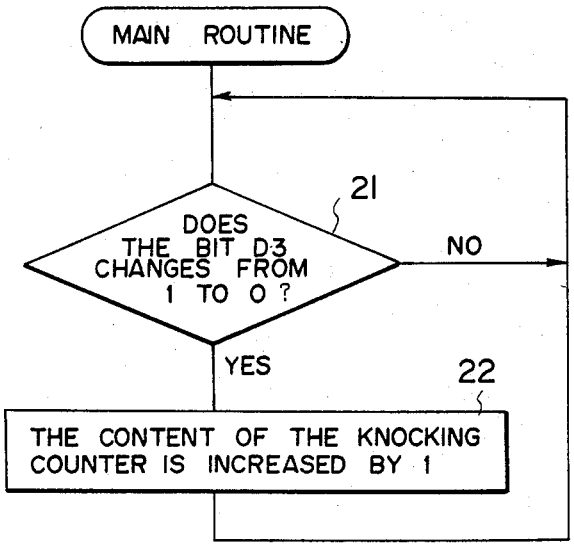
FIG. 4 is a flow chart showing a main routine of the embodiment.

The operation of the method using the above system is shown in FIGS. 4 to 6.

FIG. 4 shows a main routine of the method carried out in the sense mode, the bit D1 being set to be "1". The computer 12 is in the sense mode when no interrupt command signal is fed to the CPU 1 from the clock counter 5 or the ignition system 15. In the main routine, at first in the step 21, it is decided if the bit D3 of the control register 10 changes from "1" to "0", which means that the output signal Vk exceeds the reference voltage SL. When the result of the decision is yes, the content of the knocking counter is increased by "1" in the step 22. As the output signal Vk changes like a wave, after the bit D3 once is set to be "0", the bit D3 surely changes to "1". The higher the knocking intensity is, the more times the bit D3 changes from "1" to "0" after one ignition. Hence, the knocking intensity is stored in the knocking counter as the knocking number.

FIG. 5 shows a time interrupt routine of the method carried out in the AD converting mode, "0001" being written in the control register 10. The time interrupt routine starts when the clock counter 5 feeds the interrupt command signal to the CPU 1. The interrupt command signal is produced at every predetermined time interval, for example, 2 ms. In the first step 31, AD converter, comprising the comparator 7, the controller 8, the register 9 and converter 6, converts the output signal Vk into a digital signal, which is fed to the CPU 1. In the second step 32, the CPU 1 calculates a mean value $V_{Mi}$ of the output signal Vk according to the following formula (1):

$$V_{Mi} = \frac{(n-1)V_{Mi-1} + |Vk|}{n} \quad (1)$$

wherein, $V_{Mi}$ represents an actual mean value, $V_{Mi-1}$ represents a mean value calculated at the last time interrupt routine and n is constant value for example 256. In the third step 33, the CPU 1 increases by "1" a content of an ignition interval counter included in the CPU 1. The ignition interval counter is adapted to detect the engine speed in order to determine the constant K corresponding to the engine speed. As the time interrupt operation is carried out at a constant time interval, the ignition interval counter is increased in its content at a constant time interval. As described later, the ignition interval counter is reset to zero or cleared upon each ignition of the engine; hence, the content of the ignition interval counter represents a time interval between successive ignitions, or the engine speed. In the fourth step 34, the CPU 1 feeds the reference voltage SL calculated by an ignition interrupt routine in FIG. 6 to the AD converting data register 9 so that the reference voltage SL is stored in the AD data register 9. The ignition interrupt routine is started in response to each ignition, e.g., a trailing edge of an ignition signal as shown in FIG. 7(a). In addition, the ignition signal is fed to an igniter provided in the ignition system 15 and the igniter produces a high voltage in response to the trailing edge of the ignition signal to ignite mixture gases in the engine. In the fifth step 35, the CPU 1 writes "0010" in the control register 10 so that the operation mode of the computer 12 is changed to be the sense mode.

FIG. 6 shows the ignition interrupt routine of the method carried out when the ignition timing controller 14 feeds the interrupt command signal to the CPU 1. In the first step 41 of the routine, the CPU calculates the knocking intensity from the content of the knocking counter given in the main routine. In the second step 42, the CPU clears the knocking counter in order to make ready for the next sense mode operation. In the third step 43, the CPU feeds a signal representing the knocking intensity through the interface 4 to the ignition timing controller 14. The ignition timing controller 14 controls the ignition timing so that the ignition timing is retarded according to the knocking intensity. In the fourth step 44, the CPU 1 reads the constant K corresponding to the content of the ignition interval counter from the above table. In the fifth step 45, the CPU 1 calculates the reference voltage SL as a digital value from the following formula (2), applying the mean value $V_M$ given in the time interrupt routine and a predetermined offset voltage OFF:

$$SL = KV_M + OFF \qquad (2)$$

The reference voltage SL thus calculated stored in the AD data register 9 where the main routine is being prosecuted, i.e., in the sense mode. The reference voltage SL is converted by the DA converter 6 into an analog signal as a voltage, so that the analog signal indicative of the reference level is fed to the comparator 7.

Diagrams (a) to (e) in FIG. 7 show the operation mode of the computer 12 and various signals of the components. The diagram (a) shows change of the ignition signal described above. The diagram (b) shows the timing of the operation of the CPU 1, representing the operation of the main routine by A, the time interrupt operation by B and the ignition interrupt operation by C. The time interrupt operation B starts at the time $T_1$, $T_2$, . . . at a predetermined time interval. The ignition interrupt operation starts in response to the trailing edge of the ignition signal. The diagram (c) shows the reference voltage SL and the output signal Vk as a voltage. The diagram (d) shows the content of the knocking counter. The content is reset to zero when the ignition signal decays and is increased by "1" in every time the signal Vk exceeds the voltage SL. The diagram (e) shows the content of the ignition interval counter. The content is reset to zero when the ignition signal decays and is increased by "1" every time the time interrupt operation is carried out. A detailed description of FIG. 7(a)-(e) will be given hereunder. The reference voltage SL is calculated, in the ignition interrupt operation shown by C in the diagram (b), in accordance with the above formula (2) using the constant K, the mean value $V_M$ and offset voltage OFF. In calculating the reference voltage SL, the constant K is used which is determined in accordance with the latest engine speed indicated by the content of the counter shown in diagram (e). In this example, the content of 5 is used. Also, in this calculation, the mean value $V_M$ is used which is calculated in the time interrupt operation shown by B in the diagram (b) and started at time point T2. The reference value thus calculated, however, is not renewed in the data register 9 through the ignition interrupt operation started at time point T1, but it is renewed in the data register 9 through the time interrupt operation started at the time point T3. The renewal of the reference voltage SL is indicated in the diagram (c). In addition, in the calculation of knocking intensity of the ignition interrupt operation started at the time point Ti, the content of the knocking counter shown in the diagram (d) and counted before the time point T1 is used to output a corresponding signal indicative of the amount of ignition retardation. The content of the knocking counter counted after the time point Ti is used in the next ignition interrupt operation.

What is claimed is:

1. A method for detecting knocking in an internal combustion engine using a knock sensor, the method comprising the steps of:
    calculating a mean value of an output signal of the knock sensor;
    sensing a value corresponding to the rotational speed of the engine;
    determining a constant such that said constant is a large value when the engine rotational speed is within a low speed range and a high speed range, and is a small value when the engine rotational speed is within a intermediate speed range;
    calculating a reference value by multiplying said mean value by said constant;
    comparing an instantaneous output signal of the knock sensor with said reference value; and
    producing a knocking signal indicative of the occurrence of knocking when said instantaneous output signal exceeds the reference value.

2. A method for detecting knocking in an internal combustion engine as claimed in claim 1, wherein the step of calculating said reference value further comprises:
    adding an offset value to the result of the multiplication of said mean value by said constant.

3. A method for detecting knocking in an internal combustion engine as claimed in claim 1, wherein the step of calculating said mean value comprises
    performing a time interrupt operation at a predetermined time interval and
    calculating the mean value of the output signals of the knock sensor at the time of the present interrupt operation and at the time of at least one prior interrupt operation.

4. A method for detecting knocking in an internal combustion engine as claimed in claim 3, wherein said predetermined time interval is 2 ms.

5. A method for detecting knocking in an internal combustion engine as claimed in claim 1, wherein the step of determining said constant comprises
    performing an ignition interrupt operation at the time of each ignition; and
    providing a signal representing a predetermined value of said constant corresponding to the sensed value corresponding to engine rotational speed at the time of said interrupt operation.

6. A method for detecting knocking in an internal combustion engine as claimed in claim 5, wherein said step of performing an ignition interrupt operation starts in response to the trailing edge of an ignition signal which drives an ignition system.

7. A method for detecting knocking in an internal combustion engine as claimed in claim 1, wherein the step of calculating said reference value comprises
    performing an ignition interrupt operation at the time of each ignition; and
    calculating said reference value during said interrupt operation.

8. A method for detecting knocking in an internal combustion engine as claimed in claim 7, wherein said step of performing an ignition interrupt operation starts in response to the trailing edge of an ignition signal which drives an ignition system.

9. A method for detecting knocking in an internal combustion engine as claimed in claim 1, wherein said step of sensing a value corresponding to the rotational speed of the engine comprises
    providing an ignition interval counter;
    resetting the ignition counter to zero at the time of every ignition; and
    increasing the content of the ignition counter by "1" at predetermined time intervals between successive ignitions.

10. A method for detecting knocking in an internal combustion engine as claimed in claim 9, wherein said predetermined time interval is 2 ms.

11. A method for detecting knocking in an internal combustion engine as claimed in claim 1, wherein the step of producing a knocking signal comprises:
  providing a knocking counter;
  resetting the knocking counter to zero at the time of every ignition; and
  increasing the content of the knocking counter every time said output signal of the knocking sensor exceeds said reference value.

* * * * *